(12) United States Patent
Larson

(10) Patent No.: US 7,694,830 B1
(45) Date of Patent: Apr. 13, 2010

(54) BICYCLE STORAGE AND RETRIEVAL ASSEMBLY

(76) Inventor: Roger C. Larson, 3580 Hoffman Rd. East, White Bear Lake, MN (US) 55110

( * ) Notice: Subject to any disclaimer, the term of this patent is extended or adjusted under 35 U.S.C. 154(b) by 872 days.

(21) Appl. No.: 11/329,441

(22) Filed: Jan. 11, 2006

Related U.S. Application Data

(60) Provisional application No. 60/701,833, filed on Jul. 22, 2005, provisional application No. 60/643,101, filed on Jan. 11, 2005.

(51) Int. Cl.
*A47F 7/00* (2006.01)

(52) U.S. Cl. .......................... 211/20; 211/22

(58) Field of Classification Search ............ 211/5, 211/17, 20, 24, 85.7, 19, 22; 414/462; 224/310, 224/509, 924
See application file for complete search history.

(56) References Cited

U.S. PATENT DOCUMENTS

| | | | | |
|---|---|---|---|---|
| 565,057 A * | 8/1896 | Westphal | ......................... | 211/5 |
| 613,773 A * | 11/1898 | Neumann | ................. | 280/7.12 |
| 621,072 A * | 3/1899 | Gregory | ......................... | 211/5 |
| 639,517 A * | 12/1899 | Butcher | ......................... | 211/5 |
| 2,746,627 A * | 5/1956 | White | ........................ | 414/462 |
| 2,931,528 A * | 4/1960 | Mabry | ........................ | 414/462 |
| 3,655,082 A * | 4/1972 | Garrett | ........................ | 414/462 |
| 3,720,333 A * | 3/1973 | Vaughn | ........................ | 414/462 |
| 3,762,569 A * | 10/1973 | Spring | ........................... | 211/5 |
| 3,770,133 A * | 11/1973 | Kolker | ......................... | 211/19 |
| 3,815,721 A * | 6/1974 | Montoya et al. | ........... | 194/283 |
| 3,843,001 A * | 10/1974 | Willis | ......................... | 414/462 |
| 3,861,533 A * | 1/1975 | Radek | ......................... | 211/20 |
| 3,865,244 A * | 2/1975 | Galen et al. | ..................... | 211/5 |
| 3,865,245 A * | 2/1975 | Lieb et al. | ....................... | 211/5 |
| 3,901,421 A * | 8/1975 | Kalicki et al. | ................ | 224/310 |
| 3,927,779 A * | 12/1975 | Johnson | ....................... | 414/462 |
| 3,941,406 A * | 3/1976 | Eggleston | ........................ | 410/3 |
| 3,964,610 A * | 6/1976 | Deiner | ............................ | 211/5 |
| 3,964,611 A * | 6/1976 | Galen et al. | ..................... | 211/5 |
| 3,994,425 A * | 11/1976 | Graber | ......................... | 224/324 |
| 4,015,718 A * | 4/1977 | Bernard | .......................... | 211/5 |
| 4,039,106 A * | 8/1977 | Graber | ......................... | 224/329 |
| 4,046,297 A * | 9/1977 | Bland | .......................... | 224/504 |
| 4,077,607 A * | 3/1978 | Lovelady | ...................... | 254/88 |
| 4,189,274 A * | 2/1980 | Shaffer | ......................... | 414/462 |
| 4,213,729 A * | 7/1980 | Cowles et al. | ............... | 414/462 |

(Continued)

FOREIGN PATENT DOCUMENTS

CH             668400 A5 * 12/1988

(Continued)

*Primary Examiner*—Lanna Mai
*Assistant Examiner*—Joshua Rodden
(74) *Attorney, Agent, or Firm*—Anthony G. Eggink; Katrina M. Eggink

(57) ABSTRACT

A manually operated bicycle storage and retrieval assembly for loading, storing and unloading bikes. The storage assembly is mountable within or to the top of existing bicycle storage racks. The storage assembly has a frame, a lower track, an upper track and a dampening system which interconnects the lower and upper trolley track. The upper track has front and rear bike wheel securement structures which secure a bike to the upper track. A cooperating tool assembly is provided to operate the bicycle storage assembly and to pivot the upper track with respect to the lower track to load and unload bikes.

18 Claims, 14 Drawing Sheets

U.S. PATENT DOCUMENTS

| | | | | |
|---|---|---|---|---|
| 4,345,705 | A | * | 8/1982 | Graber ........................ 224/324 |
| 4,524,893 | A | * | 6/1985 | Cole .......................... 224/319 |
| 4,702,401 | A | * | 10/1987 | Graber et al. ............... 224/536 |
| 4,790,713 | A | * | 12/1988 | Miller ........................ 414/462 |
| 4,802,594 | A | * | 2/1989 | Graber ........................ 211/20 |
| 4,932,829 | A | * | 6/1990 | Miller ........................ 414/462 |
| 4,953,757 | A | * | 9/1990 | Stevens et al. ............... 224/310 |
| 5,040,385 | A | * | 8/1991 | Randone ....................... 70/62 |
| 5,042,705 | A | * | 8/1991 | Johansson ................... 224/315 |
| 5,052,605 | A | * | 10/1991 | Johansson ................... 224/324 |
| 5,069,595 | A | * | 12/1991 | Smith et al. ................. 414/462 |
| 5,278,538 | A | * | 1/1994 | Ainsworth et al. .......... 340/427 |
| 5,447,408 | A | * | 9/1995 | Smith ........................ 414/538 |
| 5,462,398 | A | * | 10/1995 | Hymer ...................... 414/462 |
| 5,497,927 | A | * | 3/1996 | Peterson .................... 224/519 |
| 5,505,579 | A | * | 4/1996 | Ray et al. ................... 414/462 |
| 5,549,231 | A | * | 8/1996 | Fletcher et al. ............. 224/536 |
| 5,690,259 | A | * | 11/1997 | Montani ..................... 224/310 |
| 5,762,248 | A | * | 6/1998 | Englander et al. ........... 224/324 |
| 5,833,074 | A | * | 11/1998 | Phillips ........................ 211/21 |
| 5,850,891 | A | * | 12/1998 | Olms et al. ................. 182/127 |
| 5,917,407 | A | * | 6/1999 | Squire et al. ................ 340/432 |
| 5,988,403 | A | * | 11/1999 | Robideau ..................... 211/20 |
| 6,053,336 | A | * | 4/2000 | Reeves ........................ 211/20 |
| 6,089,430 | A | * | 7/2000 | Mehls ........................ 224/509 |
| 6,149,039 | A | * | 11/2000 | Englander ................... 224/310 |
| 6,382,480 | B1 | * | 5/2002 | Egly et al. ................ 224/42.33 |
| 6,431,423 | B1 | * | 8/2002 | Allen et al. .................. 224/509 |
| 6,511,088 | B2 | * | 1/2003 | Kahlstorf ................. 280/415.1 |
| 6,698,994 | B2 | * | 3/2004 | Barrett ....................... 414/462 |
| 6,739,823 | B2 | * | 5/2004 | Shirvell ...................... 414/462 |
| 6,752,303 | B2 | * | 6/2004 | McLemore et al. ......... 224/521 |
| 6,783,041 | B2 | * | 8/2004 | Ford et al. ................... 224/536 |
| 6,866,175 | B2 | * | 3/2005 | Munoz et al. ............... 224/324 |
| 7,044,347 | B1 | * | 5/2006 | Pedrini ....................... 224/501 |
| 7,165,704 | B2 | * | 1/2007 | Lo ............................... 224/499 |
| 7,222,763 | B2 | * | 5/2007 | Pedrini ....................... 224/519 |
| 7,472,517 | B2 | * | 1/2009 | Blume ......................... 52/79.1 |
| 2002/0014504 | A1 | * | 2/2002 | Hetu .......................... 224/310 |

FOREIGN PATENT DOCUMENTS

| | | | |
|---|---|---|---|
| DE | 3447665 A1 | * | 7/1986 |
| DE | 3611532 A1 | * | 11/1986 |
| DE | 3520765 A1 | * | 12/1986 |
| EP | 511179 A1 | * | 10/1992 |
| FR | 2673404 A1 | * | 9/1992 |
| JP | 58076342 A | * | 5/1983 |
| JP | 02049867 A | * | 2/1990 |
| JP | 03128781 A | * | 5/1991 |
| JP | 05213248 A | * | 8/1993 |
| JP | 05221355 A | * | 8/1993 |
| JP | 06199256 A | * | 7/1994 |

\* cited by examiner

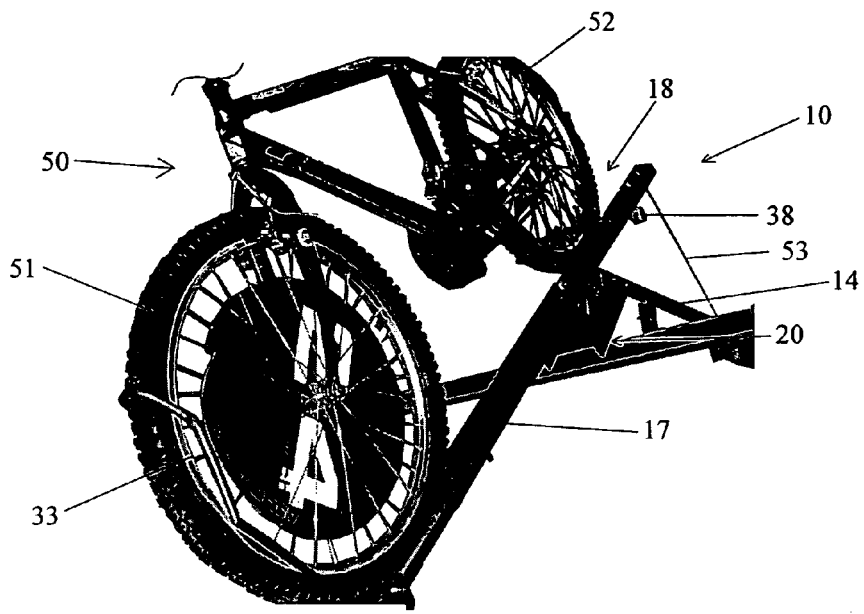
FIG 7
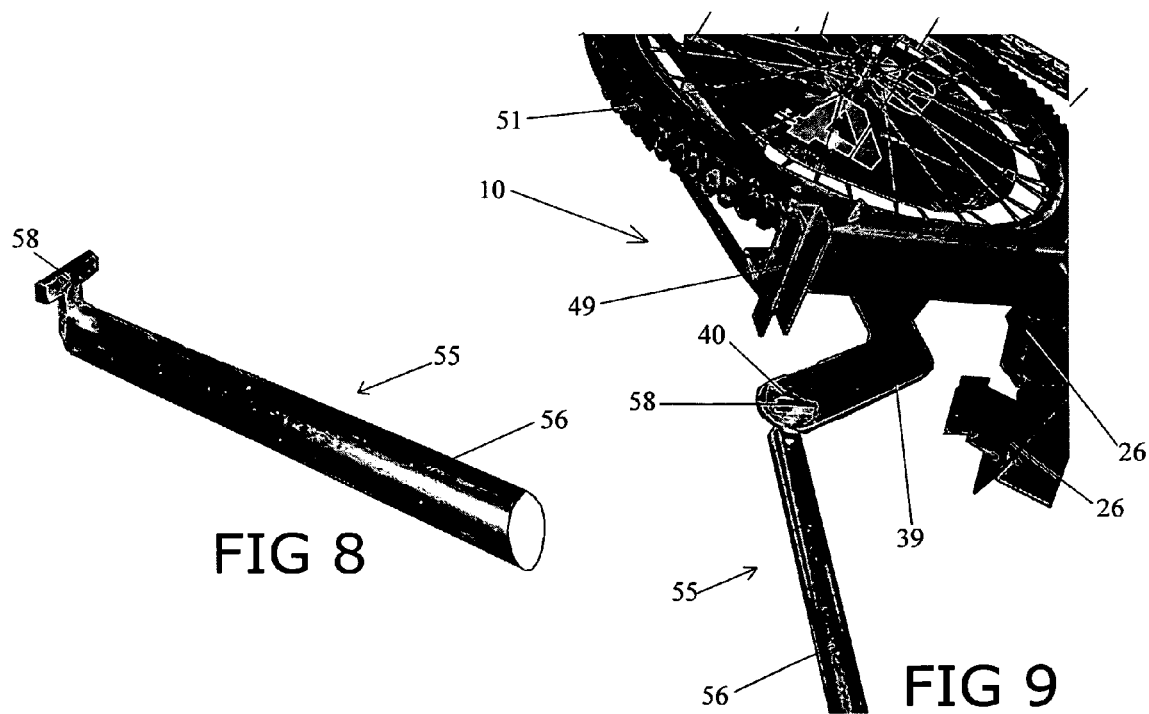
FIG 8
FIG 9

BICYCLE STORAGE AND RETRIEVAL ASSEMBLY

This application claims the benefit of U.S. Provisional Application Ser. No. 60/643,101, filed on or about Jan. 11, 2005, and U.S. Provisional Application Ser. No. 60/701,833, filed on or about Jul. 22, 2005.

BACKGROUND OF THE INVENTION

This invention relates generally to a bicycle storage and retrieval assembly and particularly to a manually operated storage assembly for loading, storing and unloading bicycles and which are mounted within or to the top of existing bicycle storage racks.

Storage systems are important in the marketing and sale of bicycles in large retail establishments, such as Wal-Mart, Target and Sears, as well as specialty stores for bicycle and related products. It has been difficult, however, to efficiently store bikes in racks generally and particularly those that are beyond easy reach. For example, the easy loading and unloading of bikes particularly above the second level of a bike storage rack has been lacking in the art. The bicycle storage assembly of the present invention provides a versatile, simple to install, easy to operate bike rack which permits the quick loading and unloading to and from safe and secure storage positions within and above present bike racks.

The bicycle storage assembly of the invention provides for the quick, easy and secured storage of bikes. Presently, it may take up to 20 minutes to retrieve a bike stored at an elevated location above an existing storage rack, i.e., utilizing ladders, etc. The storage assembly of the present invention allows for the storage and retrieval of bikes in less than 30 seconds for each operation. The assembly is constructed to store bikes of all sizes, i.e., having 20, 22, 24 and 26 inch wheels.

SUMMARY OF THE INVENTION

The bicycle storage and retrieval assembly of the invention comprises a frame structure holding a lower track and an upper track which slides on and which may pivot with respect to the lower track. A biasing means or dampening system may be connected between the lower track and the upper track. A tool member may be provided to manually operate the bicycle storage assembly so that bikes can be loaded, stored and unloaded from high storage positions.

The assembly is constructed and arranged for mounting within or to the top of existing bike racks, i.e., racks holding two levels of bikes. The bicycle assembly of the present invention may provide a third bike storage level which is beyond easy reach, but which maximizes storage space. The frame structure may have front and rear legs which are connected to the lower trolley track. The difference in height between the front and rear legs provides the storage assembly to be mounted at an angle within or on top of a bike rack.

The lower track may be mounted to the legs of the frame structure. The lower track has a front nose assembly and may have a biasing means mounted thereto. The upper portion of the track body provides means for the upper track to slide thereon. The upper track is constructed and arranged to move with respect to the lower track and also to be locked with respect thereto. The upper track has a front wheel holder structure and a movable or slidable rear wheel holder structure. The biasing means mounted to the lower track body is connected to the upper track body to provide control of the movement of the upper track with respect to the lower track.

The nose assembly of the lower track may have lock and securement means and which may be constructed and arranged to cooperate with a tool structure to operate the bicycle storage assembly of the invention and to permit the easy loading and unloading of bikes.

It is a benefit of the present invention to provide various bicycle storage rack embodiments that provide the easy and safe storage and retrieval of bicycles from storage racks. Is it a further benefit of this invention to provide a bicycle storage and retrieval rack for use in a two tier storage rack. It is yet another benefit of this invention to provide a third tier bicycle storage and retrieval rack.

These and other benefits of this invention will become clear from the following description by reference to the drawings.

BRIEF DESCRIPTION OF THE DRAWINGS

FIG. 7 shows the bicycle storage and retrieval assembly embodiment of FIG. 6;

FIG. 8 shows the tool member for use with the embodiment of FIG. 6;

FIG. 9 shows the handle member of FIG. 8 in use; and

DESCRIPTION OF THE PREFERRED EMBODIMENTS

The bicycle storage and retrieval assembly of the invention may be used within a storage rack or on top of an existing storage rack, i.e., first, second and third levels. The assembly comprises a frame structure, a lower track with a nose guide assembly, an upper track with front wheel securement means and with a cooperating movable trolley having rear wheel securement means. A biasing means may be provided to interconnect the lower and upper tracks. The upper track may have a pair of wheel assemblies which roll on the lower track and which permit a user to operate the assembly by means of a handle structure and/or a tool to load, store and unload bikes. The latter assembly describes embodiment 10 of the invention, which is for use on an elevated bicycle storage position, i.e., the third level of a bike rack.

The bicycle storage and retrieval assemblies of the present invention provide several embodiments of bicycle storage assemblies, each having various common and individual features. FIGS. 1-28 show three embodiments of the bicycle storage and retrieval assemblies of the invention, namely, embodiments 10, 60 and 80, as well as various alternative features that may be used in these embodiments. For example, embodiment 80 may be used on the second level of a bike storage rack, i.e., approximately four feet from the floor. Embodiment 80 is comprised of an upper track which is slidable along a lower track which is mounted to or in a bike rack structure. The upper track has a handle and a release member to permit movement of the upper track with respect to the lower track. A bike is positioned on the upper track using a rear wheel securement assembly and a pivotable front wheel holder. In use, the upper track extends outwardly, the front wheel holder is pivoted downwardly, the rear wheel securement assembly is unlocked and the bike is lifted off of the upper track.

Embodiment 60 may also be used as a second level bike storage rack. Embodiment 60 includes the structures discussed above with respect to embodiment 80, and also includes additional features, similar to embodiment 10. For example, the lower track includes wheel release apertures through which wheels located on the rear end of the upper track may pass to thereby free the upper track to pivot about the front of the lower track. Further, a nose assembly is located at the front end of the lower track and includes a guide and clamp member which positions the upper track and secures it in a tilted position.

Embodiment 10 is for use on a higher or third level of a bike storage rack, for example. Embodiment 10 further provides the features of both embodiments 60 and 80 as well as having a biasing means to dampen the pivot or tilt movement of the upper track with respect to the front end of the lower track.

Figure 1:
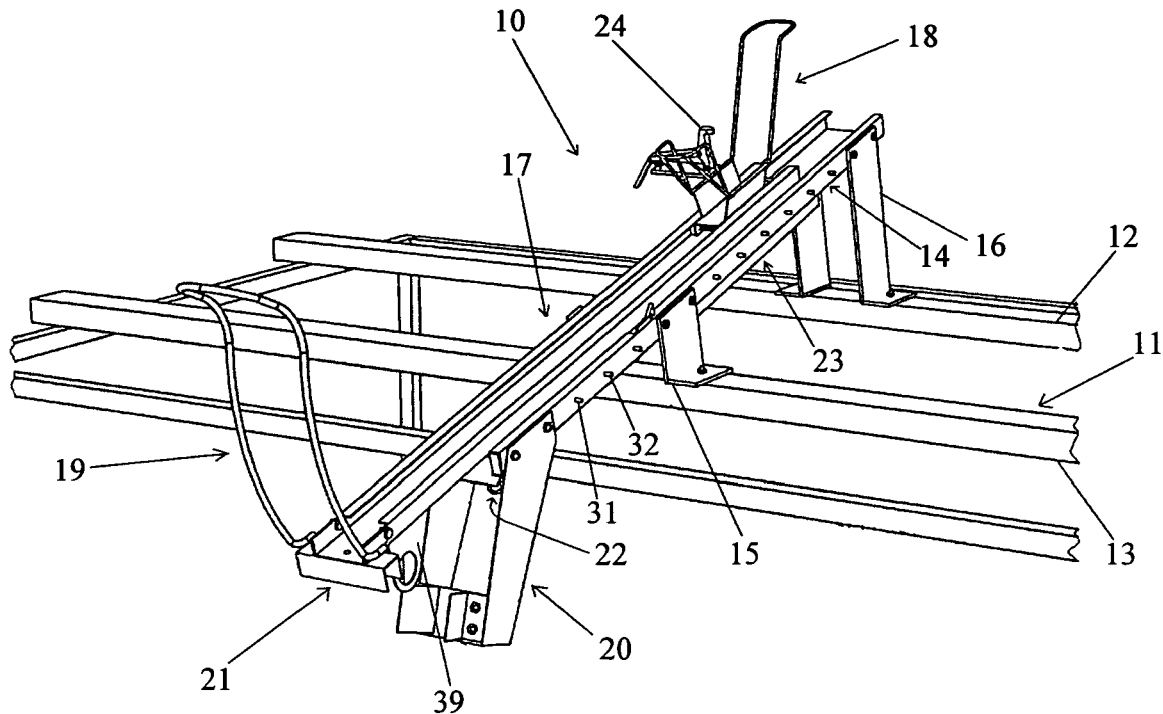
FIG. 1 is a perspective view of the bicycle storage and retrieval assembly of the present invention.

Referring to FIG. 1, the bicycle storage and retrieval assembly 10 is shown having a stationary lower track 14 mounted with legs 15 and 16 onto frame structures 12 and 13 of a bicycle rack 11. The lower track 14 has a plurality of pegs 31 and 32 which engage the legs 15 and 16 (front and rear) for adjustability purposes. An upper track 17 is shown in sliding communication with stationary lower track 14 and having movement member or nose plate 39. Assembly 10 is shown having a rolling trolley structure 18, a front wheel holder 19 and a front wheel safety release 21. The front wheel holder 19 is constructed and arranged to swing or pivot about the end or nose of the upper track 17 when the front wheel safety release or toggle structure 21 is turned. When in the locked position, and containing the weight of a bicycle wheel, the front wheel safety release 21 is constructed and arranged to remain in a locked position thereby not permitting the front wheel holder 19 to swing or pivot until the weight of the bike is removed. The lower portion of the front wheel holder 19 contains a notch to secure the safety toggle 21 when in the locked position, thereby requiring the front wheel holder 19 to be moved upwards before the safety toggle 21 is released. Alternative front wheel release structures are discussed below. Rolling trolley 18 is shown having rear wheel safety lock or latch 24. The lower track 14 is shown having upper track safety release and safety return release 22 located at its front end, or nose portion 20. The lower track 14 is further shown containing the dampener assembly 23.

Figure 2:
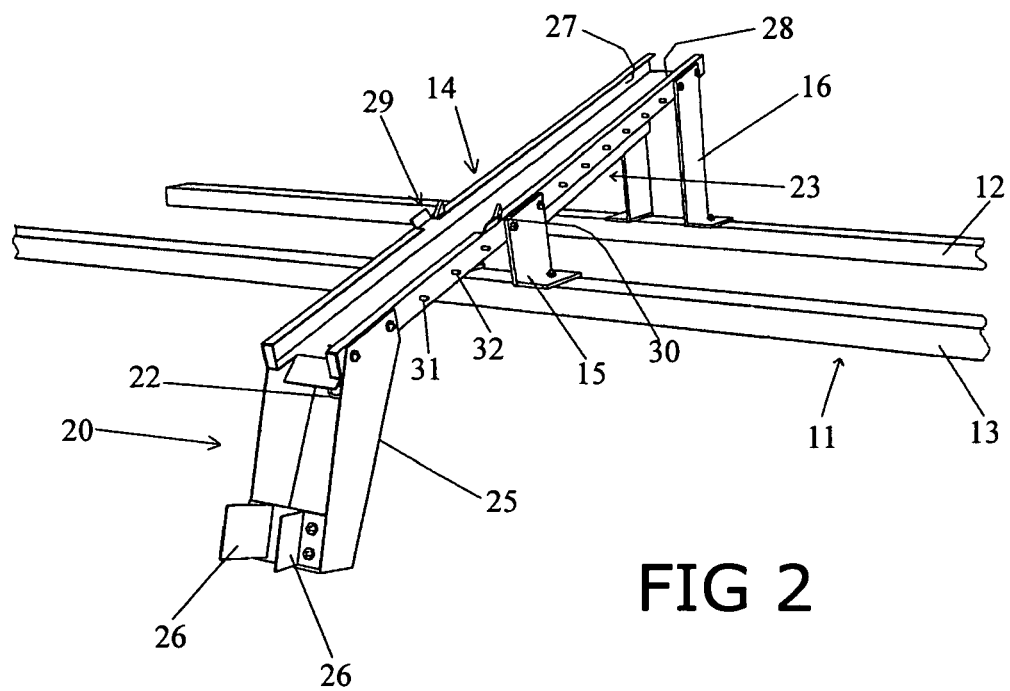
FIG. 2 is a perspective view of the lower track of the assembly.

FIG. 2 shows stationary lower track 14 attached to a frame structure 12, 13 of rack 11 via adjustable mounting legs 15 and 16. The adjustable legs 15 and 16 are shown mounted to frame members 13 and 12 which are secured to the top of an existing bike storage rack 11. The adjustability is obtained via the cooperation of the side pegs 31, 32 of the lower track 14 and the apertures in the front and rear legs 15, 16. Dampener assembly 23 is shown positioned under the lower track 14. Dampener assembly 23 is constructed and arranged to control the movement of the upper track 17 with respect to the lower track 14. The dampening means 23 may be achieved in a variety of ways known in the art, i.e. via a gas cylinder assembly, a tension brake, one or more coil springs, a double action spring mechanism, etc. Safety return release and upper track safety release 22 are shown positioned at the front end, or nose portion 20, of the stationary lower track. Nose portion of front guide structure 20 is shown including guide bracket 25 having opposing guide members 26. Upper track 17 includes wheel or rolling members, as discussed below, which fit into and travel through channels 27 and 28 of lower track 14 and which release from the lower track 14 through openings 29 and 30.

Figure 3:
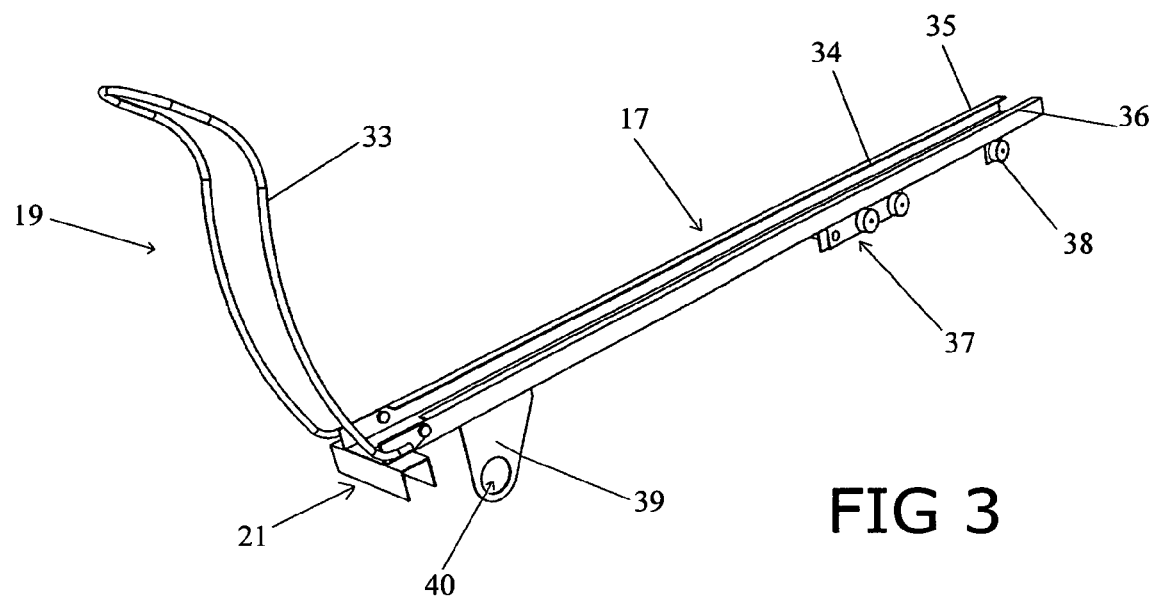
FIG. 3 is a perspective view of the upper track of the assembly.

FIG. 3 shows the upper track 17 having a rear roller assembly 38, a roll and tilt wheel assembly 37, pull down member or nose plate 39, a front wheel holder 19 comprising front wheel capture 33 and the front wheel swing down release (toggle) 21. The rear rollers 38 and roll and tilt wheel assembly 37 permit the upper track 17 to slide within the lower track 14, and the roll and tilt wheel assembly 37 further permits the upper track 17 to pivot and tilt with respect to the lower track 14. The pull down or movement member 39 is shown located at the front end or nose portion of the upper track 17 and is constructed and arranged having aperture 40 for use with a tool member (FIG. 8) to pull on upper track 17 and thereby tilt the upper track 17 with respect to the lower track 14. As discussed above, the front wheel holder 33 is constructed to remain holding or securing the front wheel of a bicycle because of the structure and cooperation of the front wheel swing down release. Upper track 17 is shown having body 34 having channels 35 and 36 which cooperate with wheels or rollers of rolling trolley 18, as further discussed below.

Figure 4:
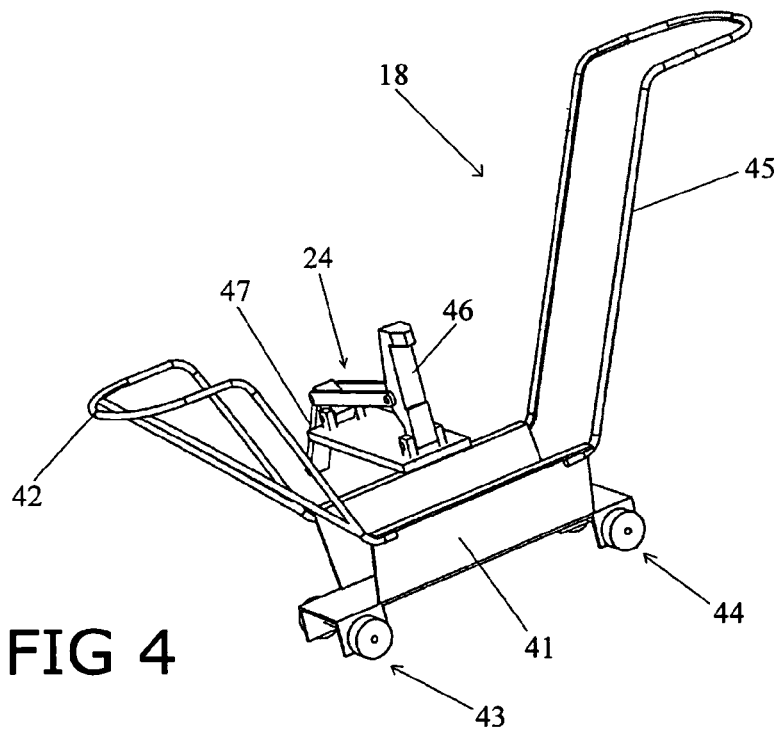
FIG. 4 is a perspective view of the rear wheel trolley of the assembly.

FIG. 4 shows the rolling trolley 18 which is constructed and arranged to capture the rear wheel of a bicycle and to roll along the upper track 17. Alternatively, the bike trolley 18 may not have any wheels and be constructed to slide within the upper track 17. Two pair of wheels or rollers 43, 44 are shown to permit this movement in the lower track 17. Rear wheel brackets and/or cages 42, 45 are shown extending from trolley body 41 and are constructed and arranged to hold a bicycle wheel in place within the rolling trolley 18 to form a rear wheel securement assembly. Rear bike wheel safety lock 24 is shown having handle 47 and latch 46 and is constructed and arranged to engage a bicycle wheel over the rim and between the spokes to capture and secure the bike wheel. The latch or clamp 46 of the rear bike wheel safety lock 24 preferably has a coating, for example, a vinyl or rubber material to minimize any damage to the bicycle wheel. The tracks, trolleys, wheel holders and associated components of the assemblies of the invention are preferably constructed of a strong and rigid material, for example, a metal or like material. The wheels or rollers of the assemblies are preferably constructed of a durable material, for example a metal, polymeric or like material.

Figure 5:
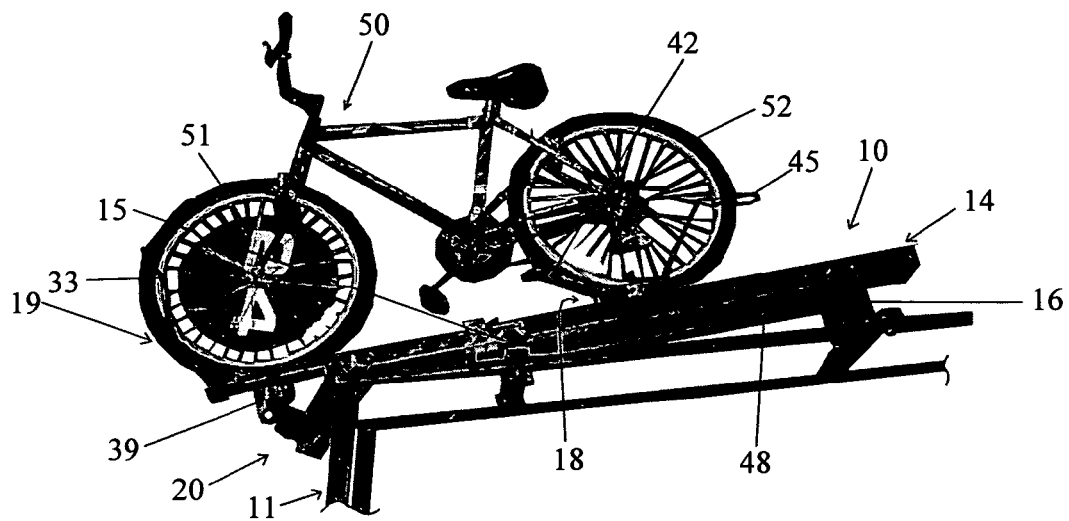
FIG. 5 is a perspective lateral view of the bicycle storage and retrieval assembly of the present invention.
Figure 6:
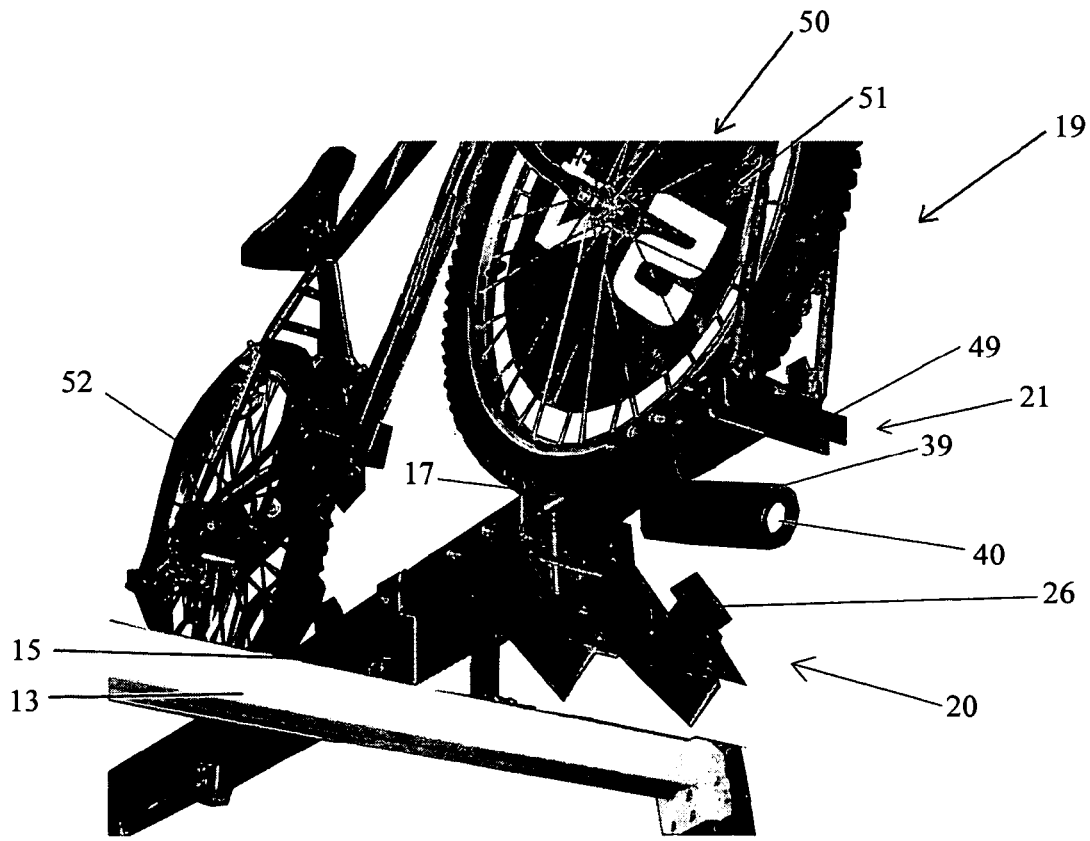
FIG. 6 is a perspective view of a bicycle storage and retrieval assembly of the present invention.

FIGS. 5 and 6 further show the bicycle storage assembly 10 in use storing a bike 50 having front wheel 51 and rear wheel 52. The assembly 10 is shown located on a frame structure 11, mounted via front leg member 15 and rear leg member 16. The assembly 10 is shown to be mounted to the top of an existing bike rack 11. The enclosure for the biasing means 48 is shown located under and cooperating with the lower track 14. The rear wheel securement brackets and/or rear wheel holders 42 and 45 are shown holding the rear wheel 52 in place, while rear wheel safety lock (further shown in FIGS. 1 and 4) is shown to have the wheel locked in place within trolley 18. Front wheel holder 19 is shown having front wheel capture structure 33 securing the front wheel 51 of the bicycle 50. A movement member 39 having a nose aperture 40 is shown located at the front end of the upper track 17. As discussed above, the nose aperture 40 is constructed and arranged to be used with a tool member 55 (shown in FIG. 8) to move and tilt the upper track 17 and to operate the assembly 10. The lower track 14 is also shown having a front guide structure or nose assembly 20, which is discussed further below.

Referring to FIGS. 5-11, the assembly 10 is shown securing a bike 50 having wheels 51 and 52 and positioned on the third tier of a bicycle storage rack. Mounting legs 15 and 16 are shown securing the assembly 10 to the storage rack 11 at a specified angle, using pegs 32 located on lower track 14 or being otherwise secured to the lower track 14. For example, a stationary lower track structure 14 may be mounted at an angle, i.e., approximately 30°, to a frame structure 13 which is adjustably mountable to an existing bike rack 11. The upper track 17 is shown to slide and tilt with respect to the lower track 14. The improvements of the assembly shown in FIGS. 5-11 include the lower track nose assembly 20, the movement member or nose plate 39 and the tool portion 55. Further, a cover 48 may be provided to house the rear portion or biasing means of the assembly. It is further within the purview of this invention to provide various release means for movement of the upper track 17 with respect to the lower track 14, for example, an eye bolt, a t-handle, etc.

FIG. 6 shows the front and bottom the assembly 10 of the present invention. The assembly 10 is shown mounted to a bike rack via a front leg member 15 onto a frame structure 13. Upper track 17 is shown having front wheel holder 19 and safety means or wheel release 21. Front wheel holder release or toggle 21 is shown having rotatable release member 49, also shown in FIGS. 9 and 10. The nose assembly or front guide structure 20 of the lower track 14 is also shown having opposing guide members 26 for guiding and securing upper track 17 in a tilted position with respect to the lower track 14.

FIG. 7 shows the bicycle storage assembly 10 of the present invention secured to a bike rack and shows the upper track 17 tilted with respect to the lower track 14. A bicycle 50 is shown having rear wheel 52 and front wheel 51 secured to the upper track 17 by rear wheel securement assembly or rolling trolley 18 (as discussed above) and front wheel holder or capture structure 33, respectively. The upper trolley track 17 is shown tilted with respect the lower trolley track 14. Referring to FIGS. 7 and 9, the nose assembly or front guide structure 20 located at the front of the lower track 14 is shown having guide members 26 which guides the upper track 17 into the proper position and locks it in place. Releasing the upper track 17 from guide members 26, permits a user to pivot the upper track 17 upwardly into a position generally parallel to the lower track 14. The upper track 17 is then locked into a parallel position with the lower track 14. In order to slide the upper track along the lower track, the slide lock 22, shown in FIGS. 1 and 2, is first released.

Figure 10:
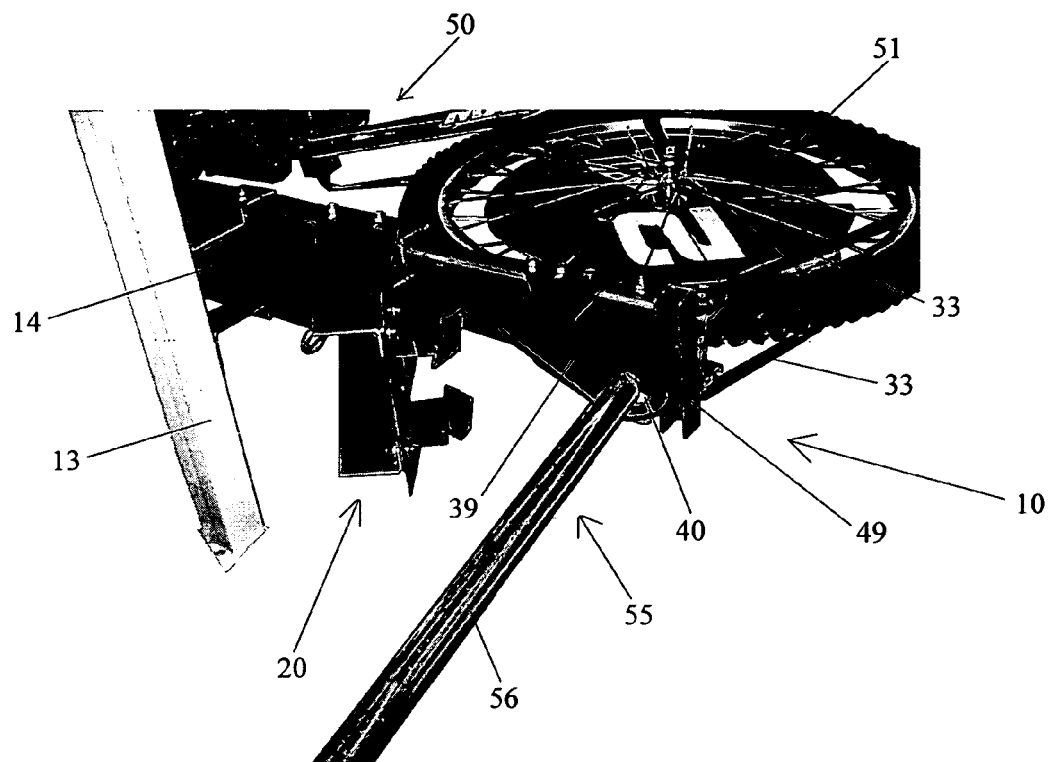
FIG. 10 also shows the handle member of FIG. 8 in use.

FIG. 8 shows the operating tool assembly 55 of the embodiment having shaft 56 and tool end 58. The tool or upper end 58 of the tool assembly 55 is used to operate the slide lock 22 at the nose assembly and to slide the upper track along the lower track using aperture 40 of pull down or movement member 39, as shown in FIG. 9. The upper end 58 of the tool assembly 55 is constructed to engage the lock 22 so that the upper track is released for movement with respect to the lower track. The tool member is also utilized to engage the aperture 40 in the front of the upper track 17 to allow the user to pull or slide the upper track 17 outward from the lower track 14, as shown in FIGS. 9-10. The upper end 58 of the handle assembly 55 may have a T or H-shaped member so that it can be secured through and in a round aperture, for example. The lower end of the shaft 56 has a handle or a pair of spaced handles (not shown). One operating tool assembly may be utilized for every 20 bicycle storage assemblies, for example.

Figure 11:
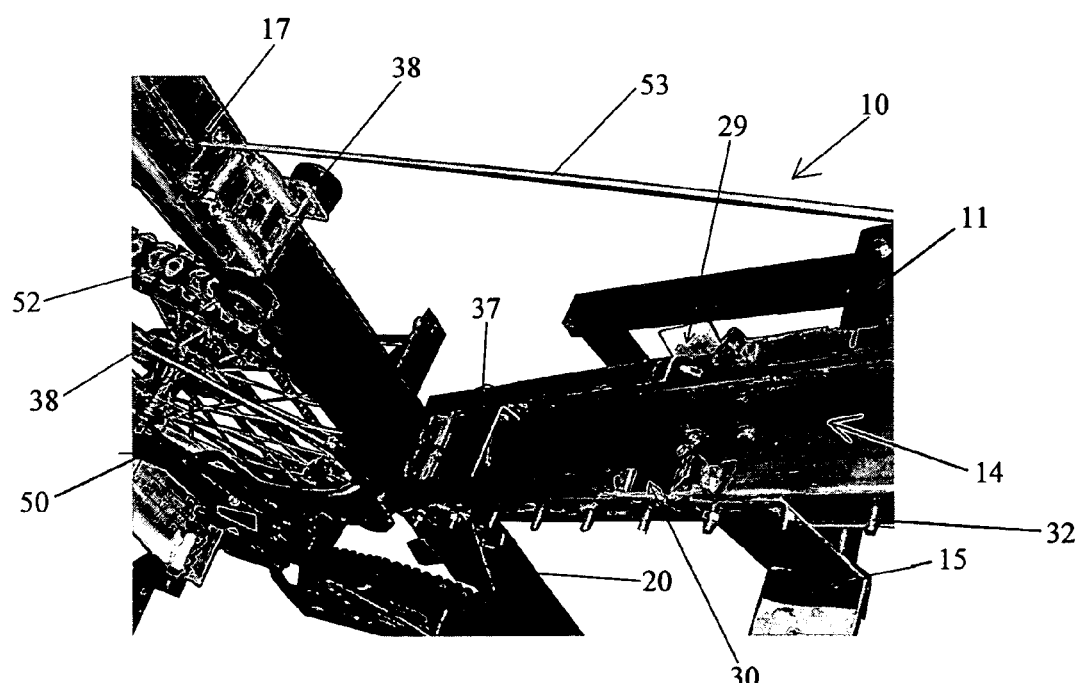
FIG. 11 is a top view of the lower track of the assembly.

FIG. 11 also shows a bike 50 secured in the bicycle storage assembly 10 of the present invention with the upper track 17 being in a tilted position with respect to the lower track 14. While various dampening means may be used with the bicycle storage assembly, a cable/pulley/gas cylinder system is shown utilized in FIGS. 1-11. The cable 53 is shown extending from the lower track 14 to the bottom of the upper track 17 in FIGS. 11 and 7, thereby permitting the upper track 17 to pivot and tilt under tension with respect to the lower track 14. Roll and tilt assembly 37, located on the bottom of upper track 17, is shown and release wheels 38, also shown in FIG. 7, are shown and which are released through apertures 29 and 30 in lower track 14 to permit upper track 17 to pivot.

The biasing means or dampening system may comprise a tension gas cylinder, a cable and a pulley, for example, whereby the cylinder and pulley are mounted at the bottom of the lower trolley track. The cable, as shown, extends from the lower trolley track structure and permits the upper track to slide and tilt under tension with respect to the stationary lower track. A 75 pound pressure cylinder may be utilized in the assembly, however, other biasing structures may be utilized within the purview of the invention. For example, other dashpot structures, tension gas pistons, etc. may be used to interconnect the upper and lower trolley tracks of the invention.

FIG. 11 further shows the lower track 14 mounted to the mounting legs 15 and particularly showing the upper track 17 pivoted with respect to the nose assembly 20 of the lower trolley track 14. A bike 50 is shown secured to the top of the upper track 17 and the rear set of wheels 38 is shown mounted to the bottom of the upper trolley track 17. The cable 53 of the dampening system or biasing means is shown connected to the bottom of the upper trolley track 17.

In use, the sequential steps in operating the bicycle storage assembly 10 to load a bike to a storage position may be as follows: A user first selects an empty assembly, uses the tool structure to slide the upper trolley track all the way forward, unlock and slide the upper track down in a near vertical position, place the back wheel of the bike into the rear wheel securement structure and lock the rear wheel with the wheel lock, slide the upper track upward with respect to the lower track so that the front wheel cage can be flipped upwards, turn the toggle to lock the front bike wheel into the front wheel cage, place the end of the tool structure into the nose of the upper track and lift the upper track upwards until a loud click is heard, utilize the handle member to pull the lock ring downward, position the tool member end into the nose assembly and slide the upper track with respect to the lower track until a loud locking click is heard, the bike is now stored in a secure position above the two tier bike rack, for example.

The sequential steps in operating the bicycle storage assembly 10 to unload a bike from a storage position is as follows: A user first selects a bike for removal from the third tier storage assembly, for example, uses the tool member to pull the lock ring down which lets the tray or upper track slide outward with respect to the lower track, hook the end of the tool member into the aperture of the nose assembly and pull the upper track out until a loud click is heard, pull the nose of the upper track downward toward the floor, while holding the bike in place, the toggle is turned to release the front wheel cage, while holding the bike, swing the front wheel cage downward, allow the back wheel in the trolley to slide down to the bottom of the upper track, while holding the bike, unlatching the back wheel of the bike, lifting the bike out of the trolley, and having the bike ready for delivery.

Figure 12:
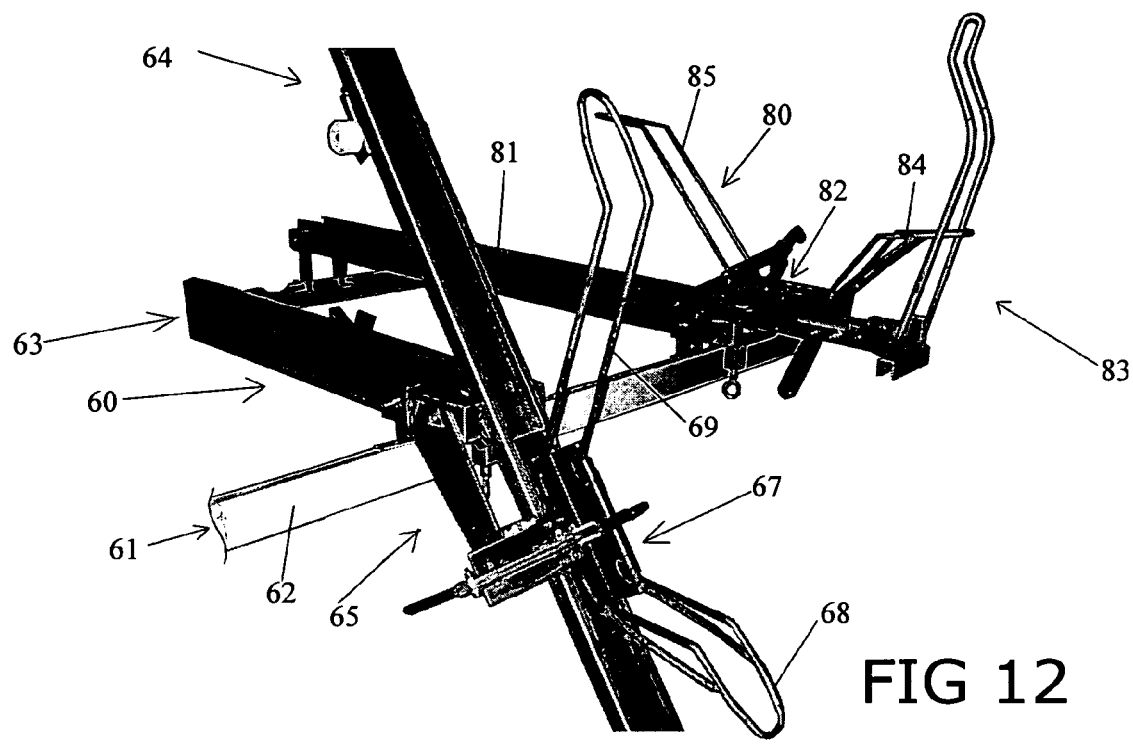
FIG. 12 shows second and third bicycle storage embodiments of the invention.
Figure 13:
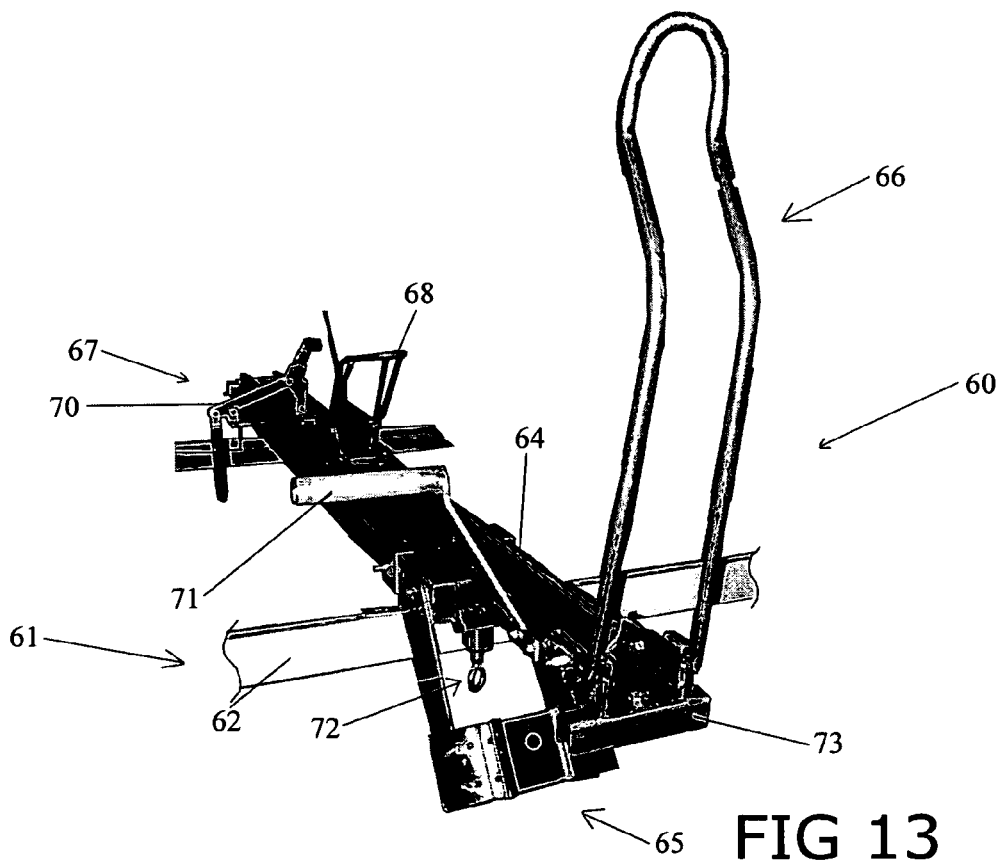
FIG. 13 shows the second embodiment of the bicycle storage and retrieval assembly of the present invention.

FIG. 12 shows embodiments 60 and 80 of the bicycle storage and retrieval assemblies of the present invention mounted side-by-side on the second tier 62 of a bike storage rack 61 using mounting legs which position the storage assemblies at an angle.

Figure 14:
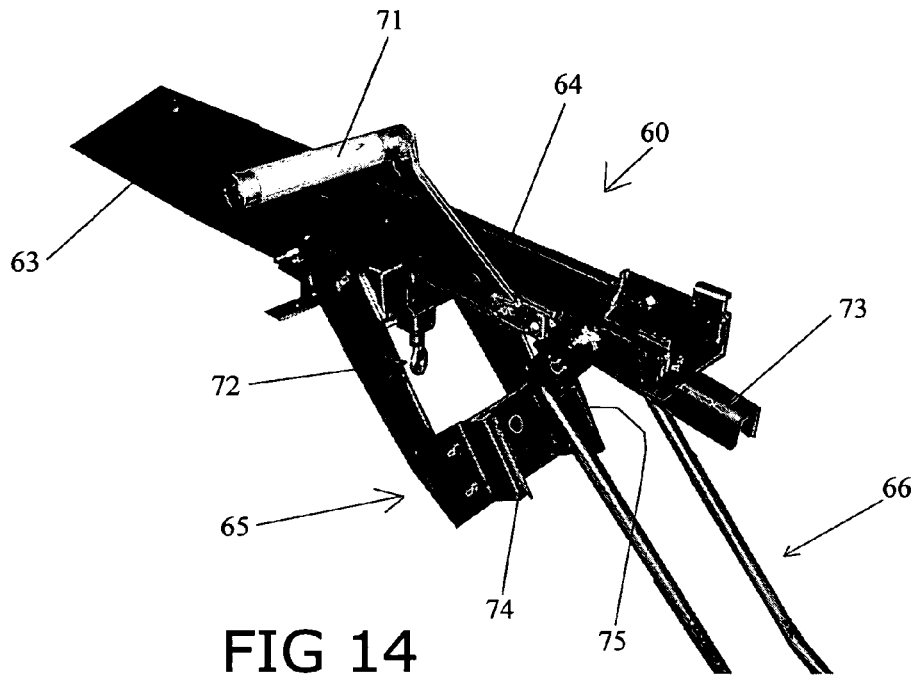
FIG. 14 shows the front end of the storage and retrieval assembly embodiment of FIG. 13.
Figure 15:
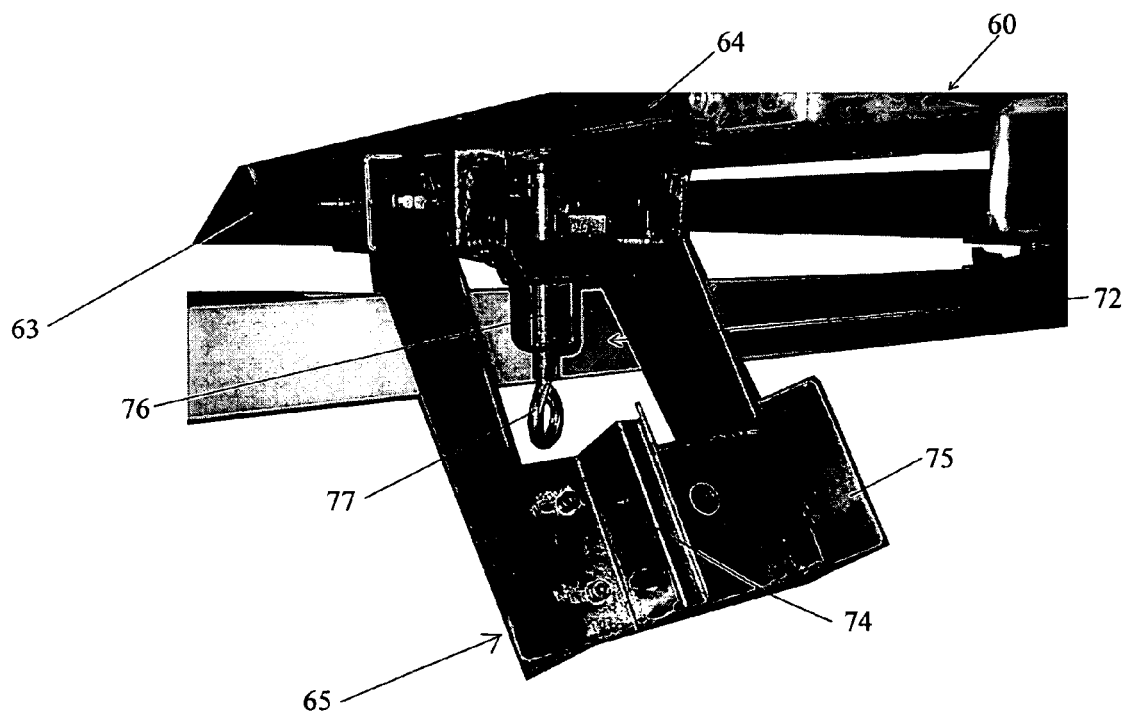
FIG. 15 shows the nose assembly of the embodiment of FIG. 13.
Figure 16:
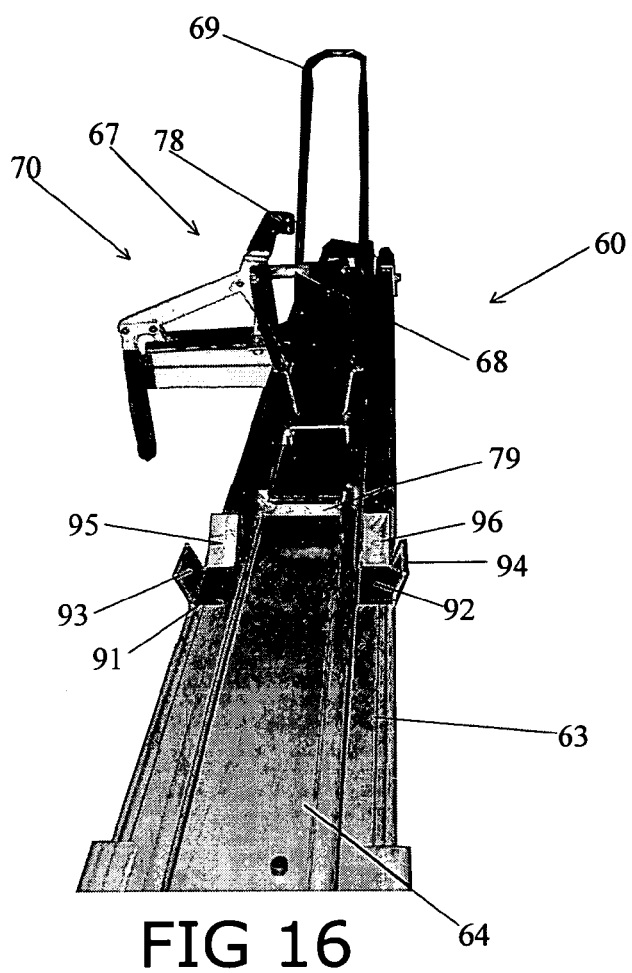
FIG. 16 shows the embodiment of FIG. 13.

Referring to FIGS. 12-17, embodiment 60 is shown having an upper track 64 which is movable with respect to a lower track 63 which is mounted to the frame member 62 of rack 61 by means of a pair of mounting legs. A bike may be secured to the rear wheel securement assembly or trolley 67 of the assembly 60 and with a front wheel holder 66. The front wheel holder 66 has a release mechanism 73 to permit it to be released and to swing and pivot with respect to the front of the upper track 64, as shown in FIG. 14. The upper track 64 may be released for movement with respect to lower track 63 using a release mechanism 72, shown in detail in FIG. 15 having spring member 76 and pull or release member 77. The upper track 64 is shown having a handle 71 to move the upper track 64 with respect to the lower track 63. The lower track 63 is shown having a nose assembly or front guide structure 65 containing the release mechanism 72 and having an outwardly extending nose portion having spring loaded clamp members 74 and 75. The spring loaded clamp members 74 and 75 are constructed and arranged to guide, receive and secure the upper track 64. As shown in FIG. 12, the upper track 64 is constructed and arranged to pivot with respect to the nose 65 of the lower track 63.

In use, the upper track 64 is released for movement with respect to the lower track 63, and pulled outward using the handle member 71. The handle member 71 is then pushed downwardly to release the wheels 99 and 100 of the upper track 64, shown in FIG. 17, through the wheel release apertures 91 and 92 shown in FIG. 16. The upper track 64 is then secured and snapped into place on the nose assembly 65 of the lower track 63. The front bicycle wheel may then be released using the release mechanism 73 on the front end of the upper track 64 to release the front wheel holder 66 and to permit the front wheel holder 66 to pivot with respect to the end of the upper track 64. The rear wheel securement assembly 67 having wheel cage or capture structures 68 and 69 may then be moved with respect to the upper track 64 towards the user of the bike storage assembly. A stop means 79 comprising a bar structure extending across the upper track 64 prevents the rear wheel securement assembly 67 from moving all the way down the upper track 64. The user may then release the rear wheel using the handle on the rear wheel lock 70 to release the lock mechanism 78 from the rim of the rear wheel. The user may then lift the bicycle off of the upper track 64. This embodiment may also be provided having a non-pivotable front wheel holder.

Figure 17:
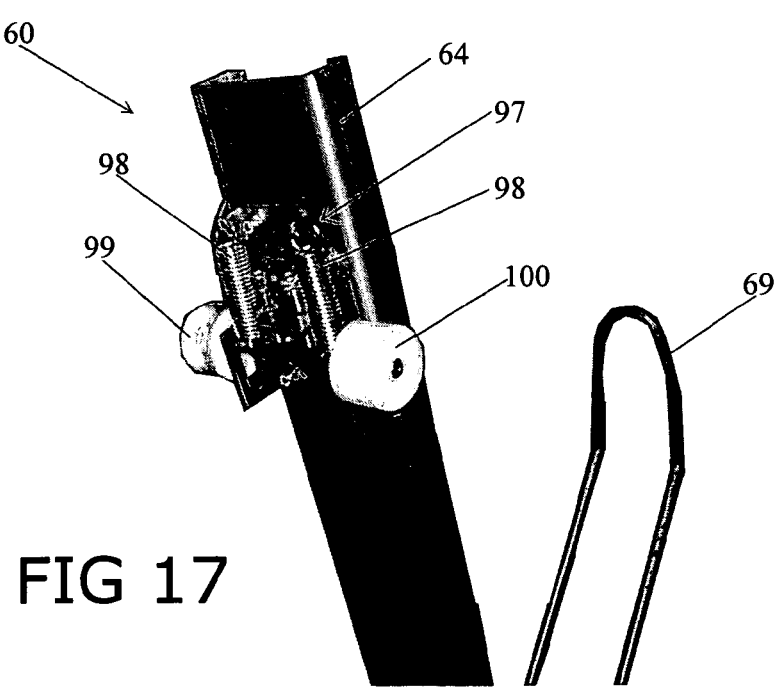
FIG. 17 shows the rear end of the upper track of the embodiment of FIG. 13.
Figure 18:
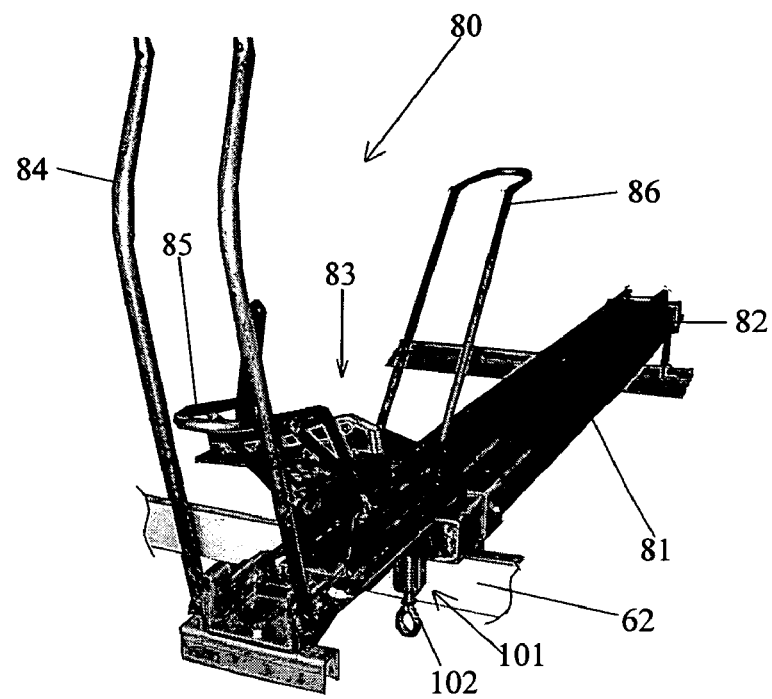
FIG. 18 shows the third embodiment of the bicycle storage and retrieval assembly of the present invention.

The steps are reversed for putting a bicycle onto assembly 60. Release wheels 99 and 100 are guided into the channels of lower track 63 by side guides 93 and 94 and rear guides 95 and 96, respectively, shown in FIG. 16. As shown in FIG. 17, track movement assembly 97, having release wheels 99 and 100 connected by an axle, further includes spring members 98 which provide flexibility and ease the movement of the wheels 99 and 100 in the channels of the lower track and through the release apertures 91 and 92.

Referring to FIGS. 18-21, assembly 80 is shown mounted to the second level 62 of a bike storage rack using mounting legs at the front and rear of the assembly. The rear mounting legs are shown to be longer that the front mounting legs 105 so that the assembly is disposed at an angle of approximately 10 degrees. The assembly 80 is constructed and arranged to receive a bicycle and to hold the bicycle by both front and rear wheels. As the other embodiments of the invention, assembly 80 includes an upper track 82 which slides with respect to a lower track 81. The assembly is further shown to have a rear wheel securement assembly 83 which moves with respect to upper track 82 and having two wheel capture or bracket members 85 and 86 and a locking structure 87 for holding the rear wheel of a bicycle. The locking structure 87 is comprised of a handle member 88 which, when moved, causes lock member 89 to hook over the rim of the rear wheel of a bike.

Figure 19:
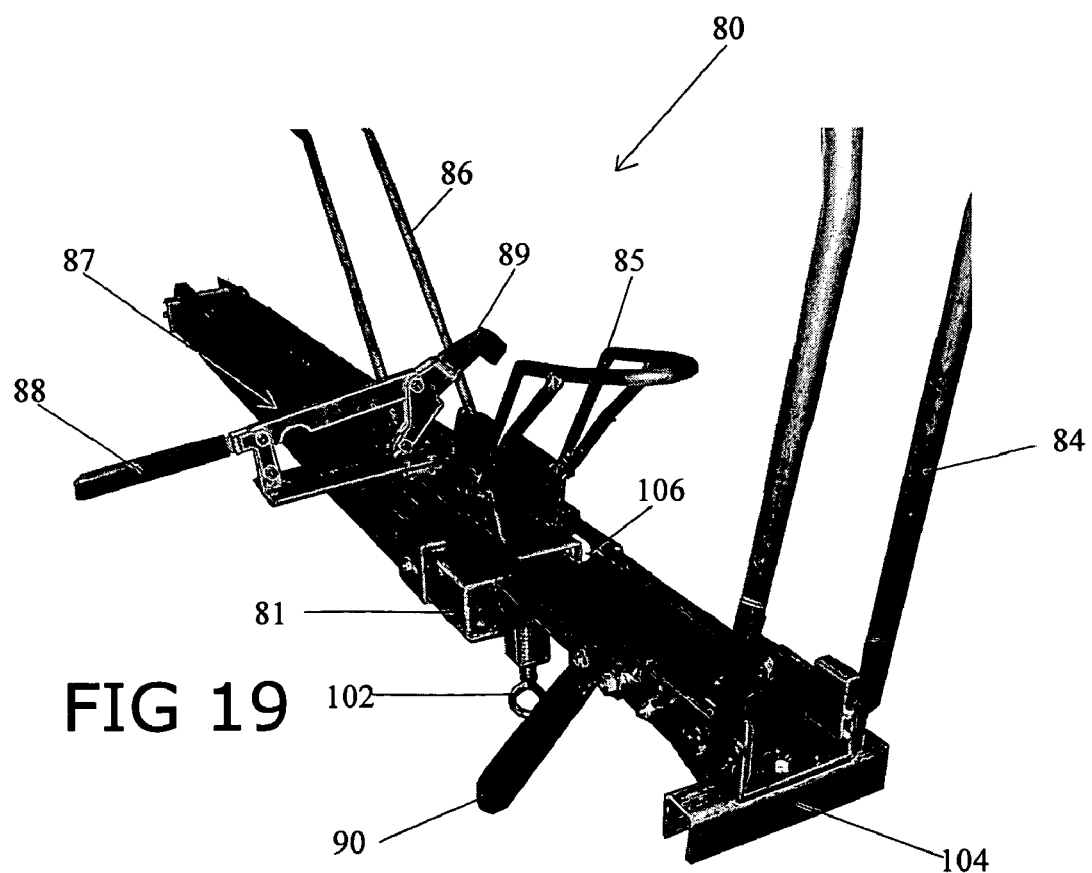
FIG. 19 shows the bicycle storage and retrieval assembly of the FIG. 18.
Figure 20:
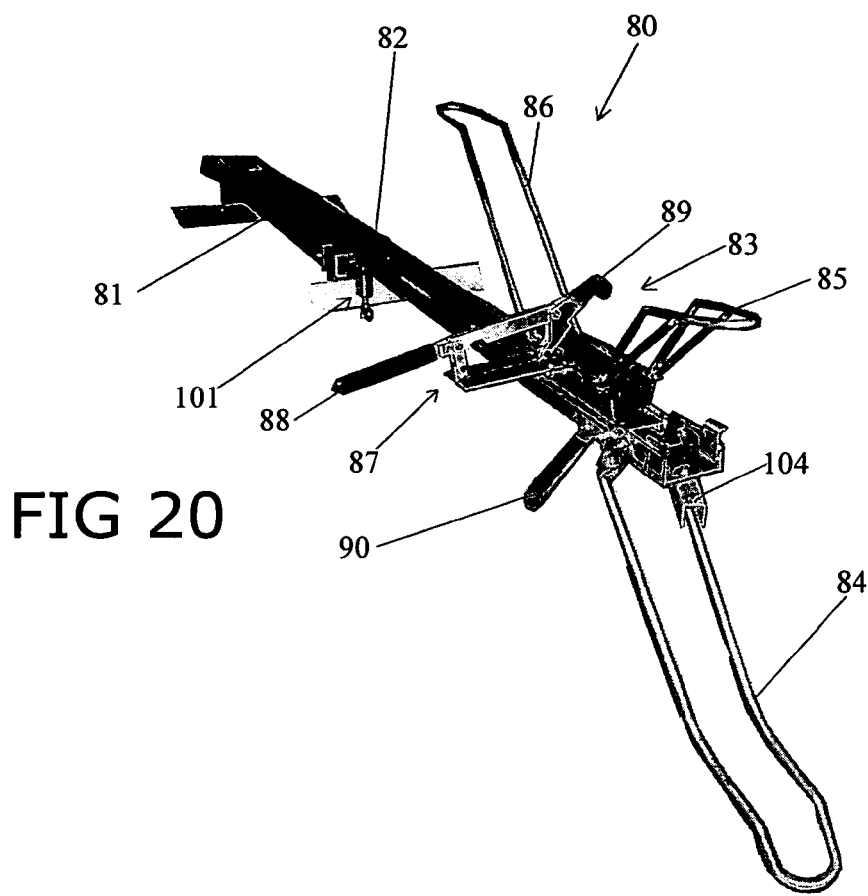
FIG. 20 is a perspective view of the embodiment of FIG. 18.
Figure 21:
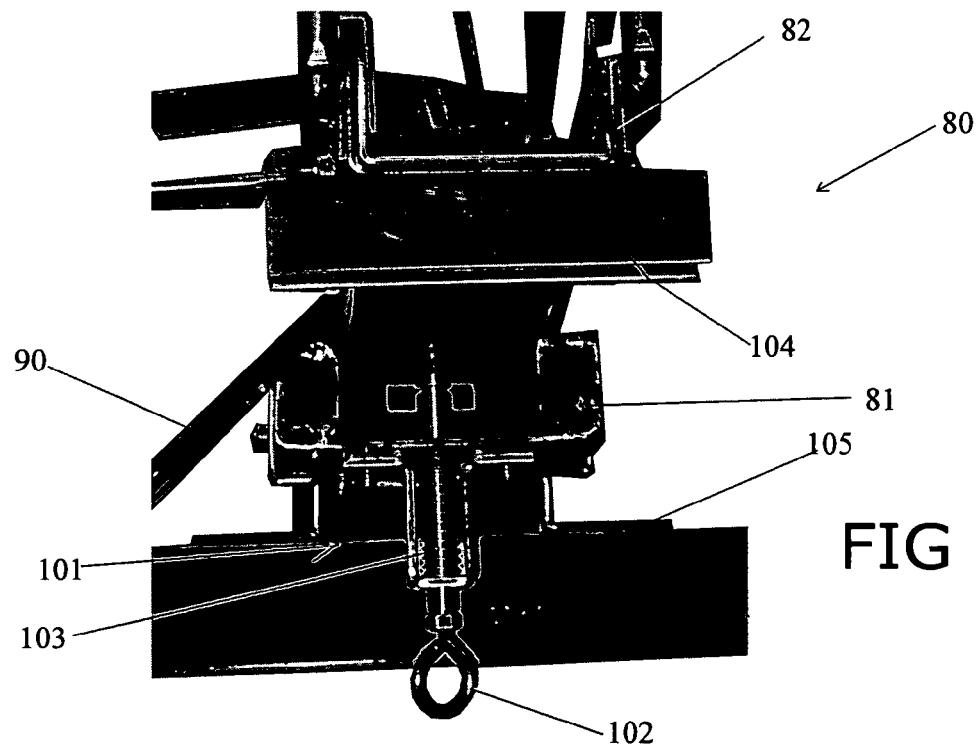
FIG. 21 is a perspective view showing the front end of the embodiment of FIG. 18.

As shown in FIG. 19, the rear wheel securement assembly 83 is constructed and arranged having rollers 106 permitting it to move with respect to an upper track 82 which has a front wheel capture member 84 at its front end. The front wheel holder 84 is activated by using a release mechanism 104, permitting the rear wheel trolley 87 to roll forward and to thereby provide easy access to the bike. A locking mechanism 87 is provided on the rear wheel securement assembly 83 to secure the rear wheel in place. The upper track 82 is constructed and arranged to be movable with respect to a lower track 81 which is secured to the bike storage rack 62 by means of the mounting legs. A release mechanism 101 is provided to release the upper track 82 for movement with respect to the lower track 81. Upper track 82 is shown fully extended with respect to lower track 81 in FIG. 20. Release mechanism 101 is shown in FIG. 21 having spring member 103 and pull or release 102. A handle 90 is shown provided and attached to the upper track 82 to permit the track to be pulled out and moved with respect to the lower track 81.

As discussed above, with respect to embodiments 10, 60 and 80, a bicycle may be easily and efficiently loaded, stored and unloaded according to the teachings of the invention. Alternative elements may also be utilized in these embodiments to provide further advantages. In FIGS. 22-27 features are shown which may be incorporated into embodiments 10, 60 and 80, although shown as part of embodiment 80. In FIG. 28, an alternative structure is shown with respect to embodiment 10, and which may also be incorporated into embodiment 60.

Figure 22:
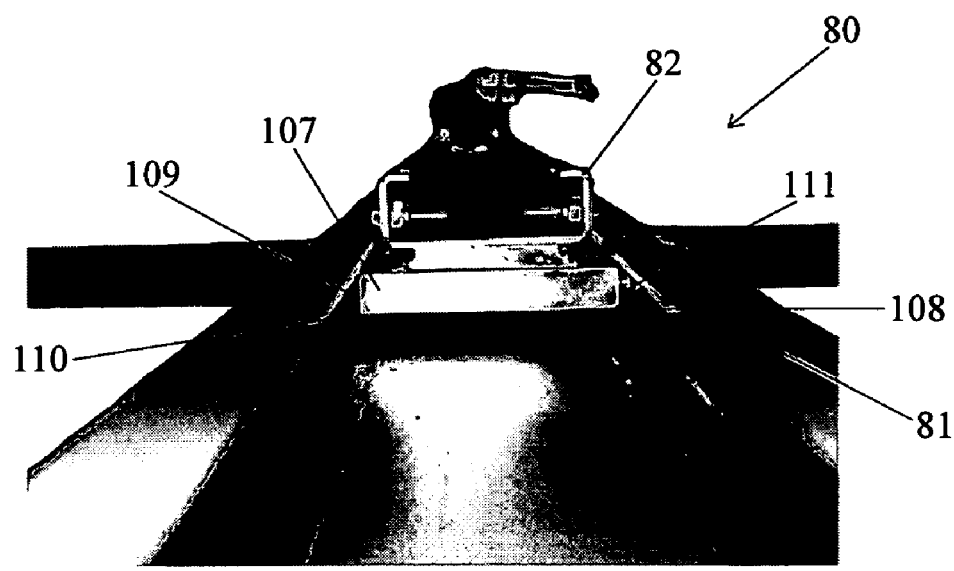
FIG. 22 is a perspective view showing the upper track of the assembly of the invention.

Specifically, FIG. 22 shows lower track 81 of embodiment 80 wherein wheel assembly 107 of upper track 82 is shown having opposing wheels 108 and 109 within the side channels of lower track 81. The wheels 108 and 109 have spring means 110 and 111 which force the wheels outwards against the side channel walls so that upon pivoting the upper track 82 with respect to lower track 81 the bicycle is able to be brought forward in a controlled manner. Other friction or wheel movement control means with respect to the upper track may be utilized within the purview of the invention.

Figure 23:
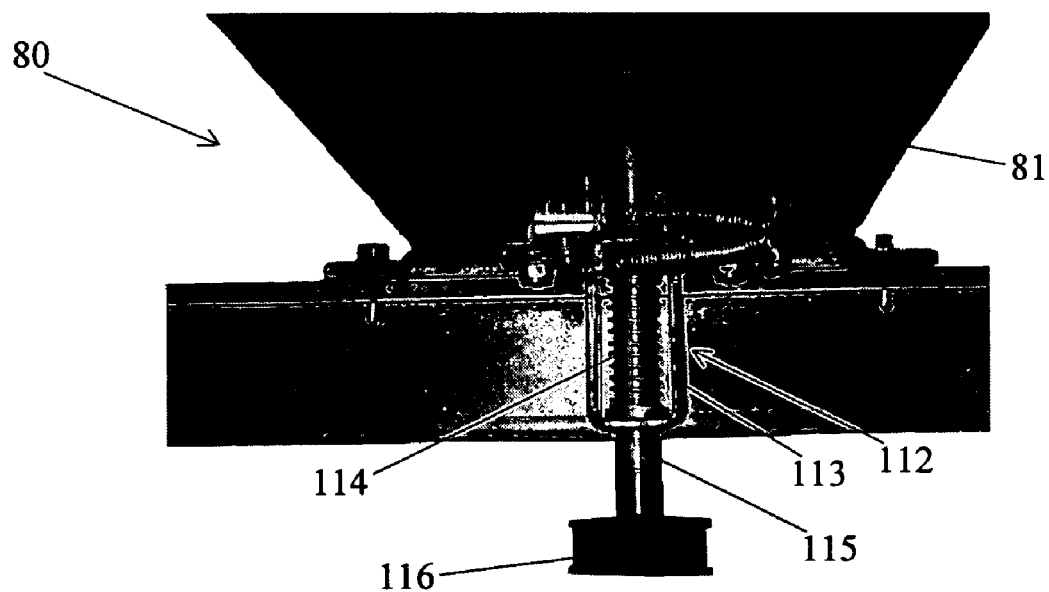
FIG. 23 is a perspective view showing the bottom of the lower track of the invention.

FIG. 23 shows lower track 81 of embodiment 80 having an upper track release structure 112 comprising a bracket 113 mounted to the bottom of lower track 81 and a shaft 115 having an operating knob 116. The opposite end of shaft 115 extends through an aperture in the bottom of lower track 81. Spring 114 disposed about shaft 115 and held within the bracket 113 biases the end of shaft 115 against the bottom of upper track 82 and forces the end into an aligned aperture to secure upper track 82 with respect to lower track 81 when the assembly is in the storage position.

Figure 24:
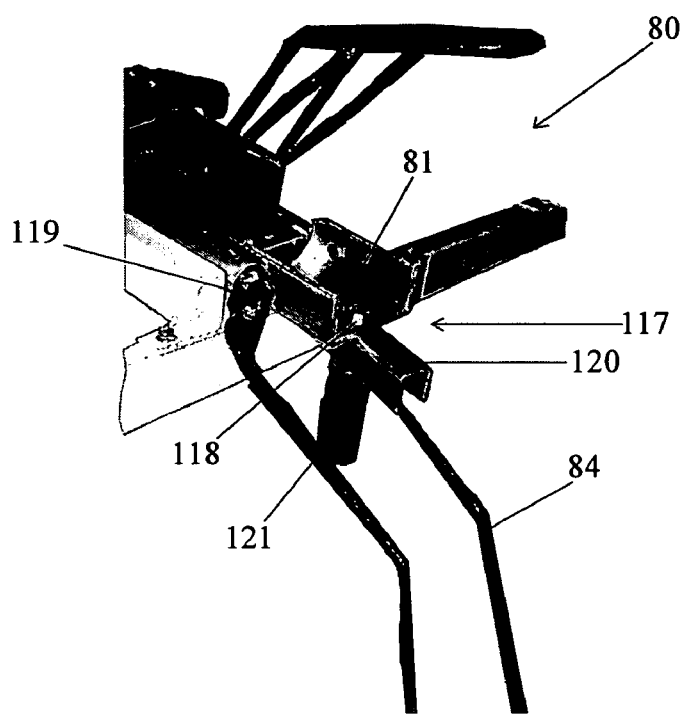
FIG. 24 is a perspective showing the front wheel release structure of the invention.
Figure 25:
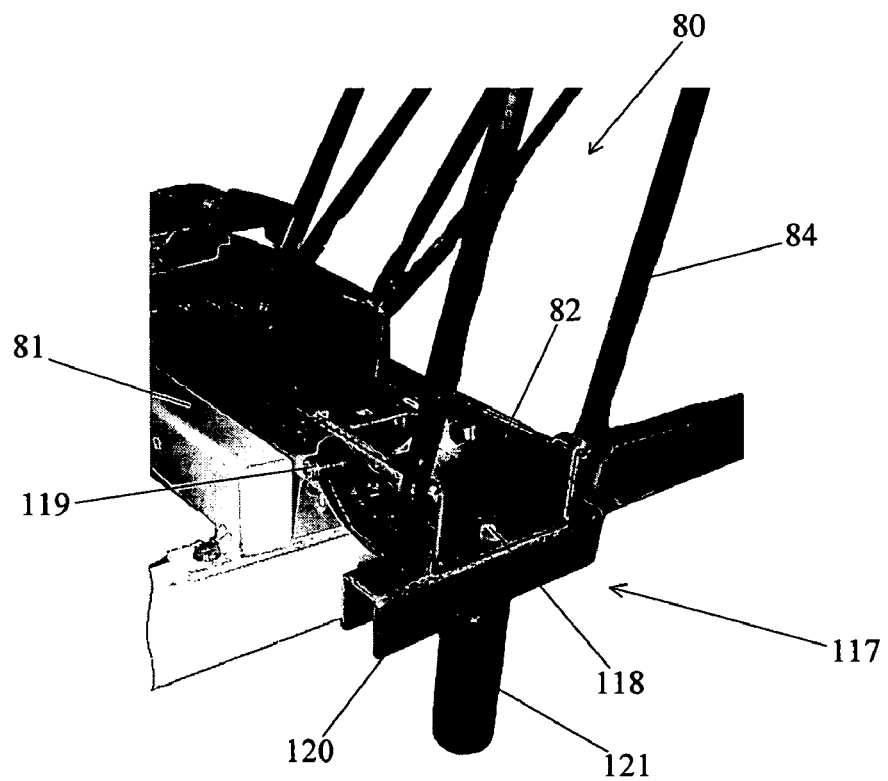
FIG. 25 is a perspective view showing the wheel release of FIG. 24 in an open position.

FIGS. 24 and 25 show embodiment 80 having a front wheel release structure 117 in the open and closed position, respectively. The wheel release structure 117 permits the rigid and formed front wheel holder structure 84 to rotate about pivot members 119 mounted to upper track 82. The curved bottom portions of the holder structure 84 rest on lever structure 120 when the assembly is in the closed position (FIG. 25). Lever structure 120 with handle member 121 rotates about pivot member 118 and when turned 90 degrees allows front wheel holder structure 84 to drop, as shown in FIG. 24, so that the upper track 82 and bike with the rear wheel secured in the movable trolley, can be brought forward with respect to lower track 81.

Figure 26:
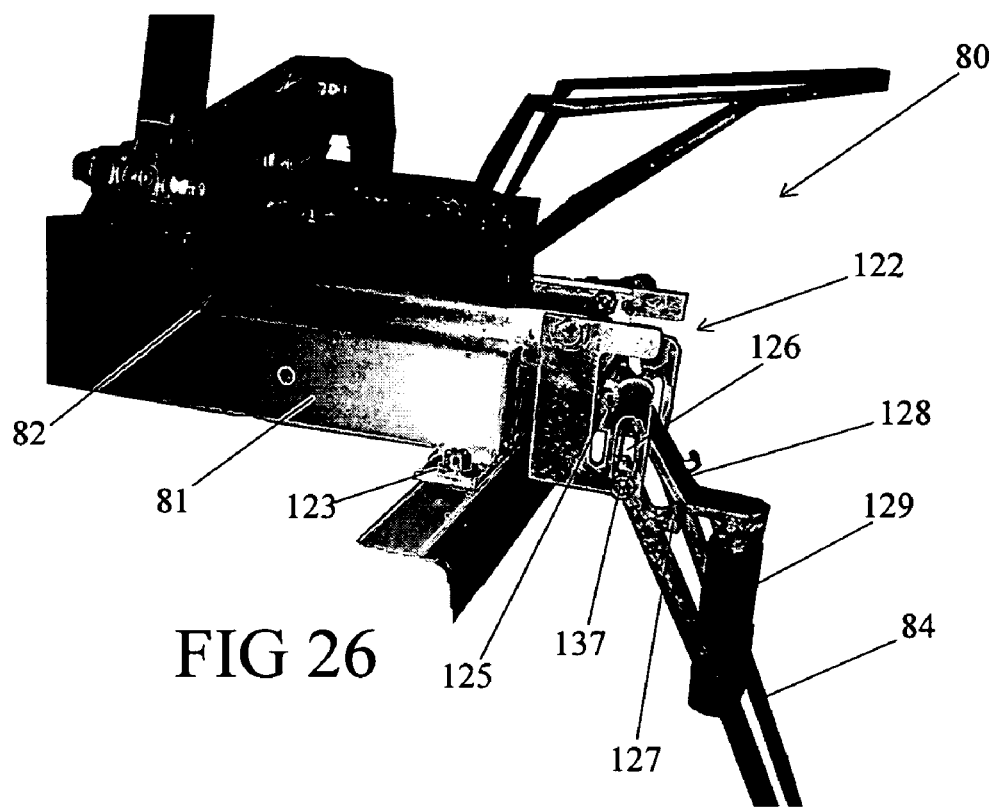
FIG. 26 is a is a perspective view showing another front wheel release structure.
Figure 27:
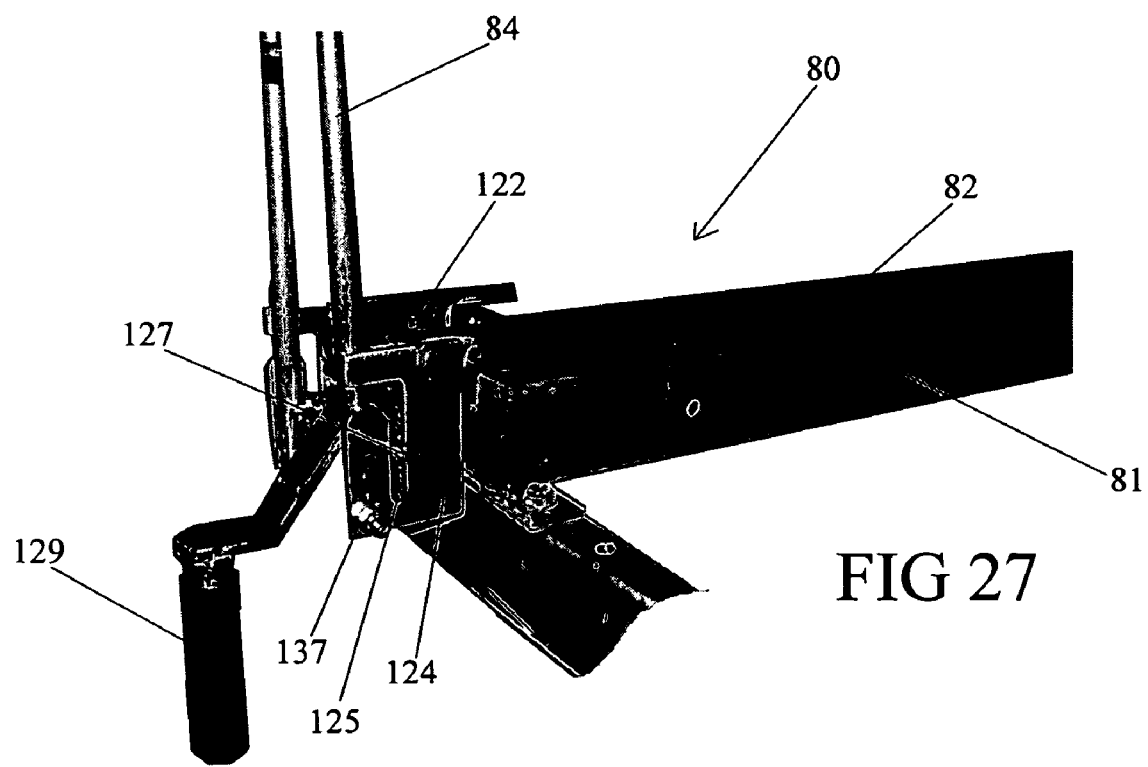
FIG. 27 is a perspective view of the front wheel release structure of FIG. 26 in a closed position.
Figure 28:
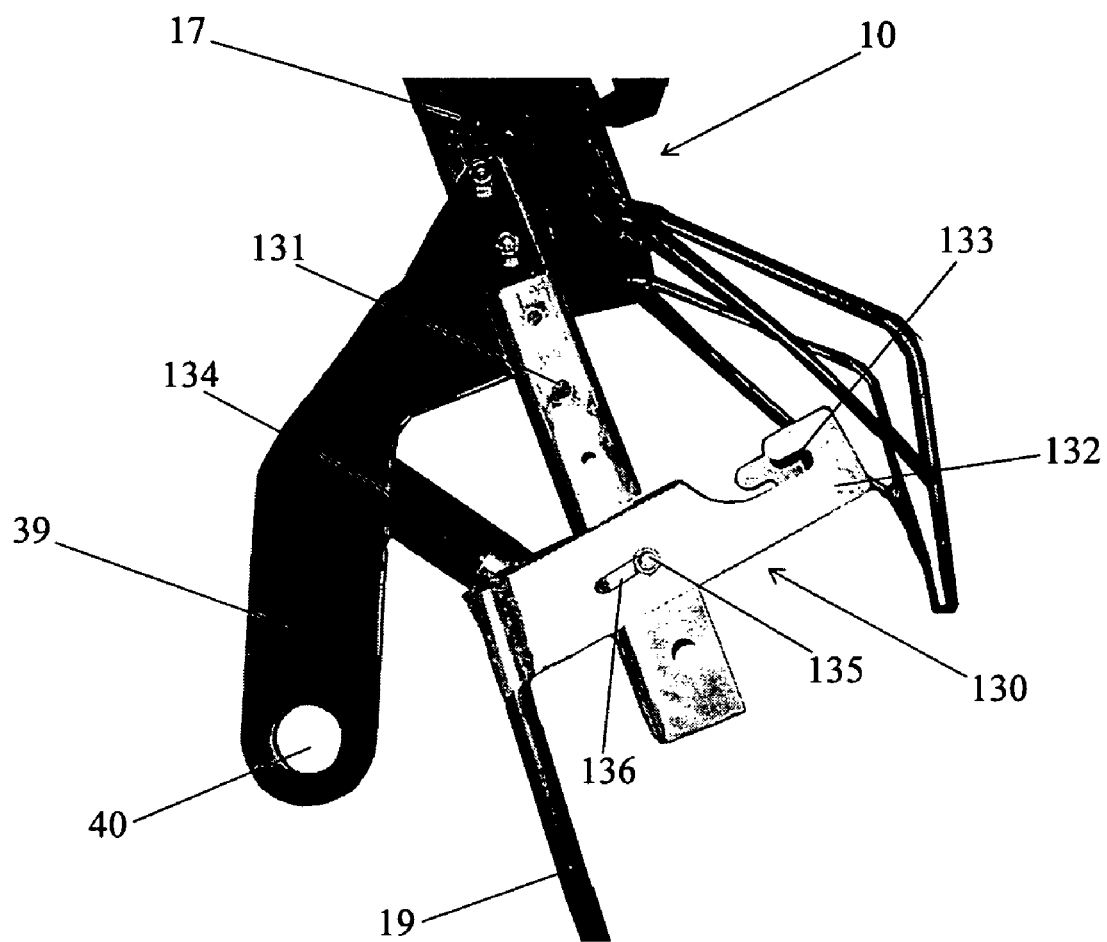
FIG. 28 is a perspective view showing another front wheel release structure of the invention.

FIGS. 26 and 27 show embodiment 80 having a front wheel release structure 122 mounted to the end of upper track 82. Lower track 81 is shown mounted directly to a frame member of the bike rack via mounting bracket 123. The release structure 122 is shown having opposing brackets 24 having an L-shaped slot 125 and an interior slot 126 in which the ends 127 of formed front wheel holder 84 are held for both movement and rotation. The wheel holder structure 84 further has outwardly extending pegs 127 which slide into the opposing L-shaped slots 125 so that the wheel holder structure 84 may be moved from the open position (FIG. 26) to the closed position (FIG. 27). Handle 129 is shown attached to the forward end of upper track 82 so that it can be moved with respect to lower track 81.

FIG. 28 shows upper track 17 of embodiment 10 having front wheel release structure 130. Shown in the open position, the release structure 130 has opposing brackets 132, each with a slot 136 and which move and rotate with respect to outwardly extending pins 135 mounted to the sides of upper track 17. At one end of bracket 132 the front wheel holder structure 19 is shown mounted and at the opposite end a slotted aperture 133 is shown and which cooperates with peg 131 extending from the side of upper track 17. A handle member 134 is further shown mounted between brackets 132 and which permits the upper track 17 and wheel release structure 130 to be operated.

As many changes are possible to the bicycle storage and retrieval assembly of this invention, utilizing the teachings thereof, the description above and the accompanying drawings should be interpreted in the illustrative and not the limited sense.

That which is claimed is:

1. A bicycle storage and retrieval assembly for mounting to an elevated position of a storage rack structure comprising:
    a) a mounting structure for attachment to a storage rack structure;
    b) a lower track assembly secured to said mounting structure and having opposing side channels with release apertures, a rear portion and a front portion having a nose assembly fixed thereto and extending downwardly therefrom at a predetermined angle with respect to said lower track, said nose assembly having upwardly extending, opposing angled guide wall members;
    c) an upper track assembly having a top and a bottom and front and rear portions and having a first pair of rollers attached to said bottom of said rear portion and a roll and tilt assembly with a second pair of rollers attached to said bottom between said front and rear portions, said first and second pairs of rollers extending outwardly from said upper track assembly and being arranged to move within said opposing side channels of said lower track assembly, said first pair of rollers configured to pass through said release apertures to permit said upper track assembly to pivot about said roll and tilt assembly with respect to said lower track assembly, said opposing angled guide wall members of said nose assembly securing said upper track in pivotal alignment at said predetermined angle with respect to said lower track, said upper track assembly further having opposing side channels;
    d) a front wheel cage structure pivotally attached to said front portion of said upper track assembly, said front wheel structure for receiving a front wheel of a bicycle; and
    e) a rear wheel securement assembly having a movable base with rollers and a cage structure extending upwardly therefrom and being adapted to receive a rear wheel of a bicycle, said rollers of said movable base arranged to move within said opposing side channels of said upper track, said rear wheel securement structure further having a locking structure comprising a handle portion and a latch portion for clamping and securing a rear wheel of the bicycle.

2. The bicycle storage assembly of claim 1, wherein said upper track assembly includes a release mechanism for releasing said front wheel cage structure to pivot with respect to said upper track assembly.

3. The bicycle storage and retrieval assembly of claim 1, wherein said opposing angled guide wall members are constructed of spring steel.

4. The bicycle storage and retrieval assembly of claim 1, wherein said upper track includes a stop means to stop said rear wheel securement assembly from moving along said upper track.

5. A bicycle storage and retrieval assembly for mounting to an elevated position of a storage rack structure comprising:
    a) a lower track assembly having opposing side channels, a front portion and a rear portion for securement to an elevated position of a storage rack structure, said lower track assembly having a nose structure fixed thereto disposed at said front portion and having opposing angled guide walls extending upwardly from said nose structure, said nose structure further being disposed at a predetermined angle with respect to said lower track assembly;
    b) an upper track assembly having a first set of rollers arranged to move within said opposing side channels of said lower track assembly, said upper track assembly being slidable and pivotable with respect to said lower track assembly and further being held between said opposing angled guide walls in pivotal alignment at said predetermined angle, said upper track assembly further having opposing side channels; and c) a front wheel cage structure pivotally attached to said front portion of said upper track assembly and having a cage configuration to receive a front wheel of a bicycle; and d) a rear wheel securement assembly having a movable base member with a second set of rollers arranged to move within said opposing side channels of said upper track assembly, at least one cage structure extending from said rear wheel securement assembly and a locking structure having a handle portion and a latch portion attached to said rear wheel securement assembly for clamping and securing a rear bicycle wheel.

6. The bicycle storage and retrieval assembly of claim 5, wherein said upper track assembly includes a release mechanism for releasing said front wheel cage structure to pivot with respect to said upper track assembly.

7. The bicycle storage and retrieval assembly of claim 5, wherein said upper track assembly has a bottom and wherein said upper track assembly has a roll and tilt assembly attached to said bottom and having a third set of rollers extending outwardly from said bottom from said bottom and being arranged to move within said opposing side channels constructed and arranged to of said lower track.

8. The bicycle storage and retrieval assembly of claim 7, wherein said lower track includes release apertures in said side channels through which said first set of rollers of said upper track pass to permit said upper track to pivot about said roll and tilt assembly with respect to said lower track assembly and wherein said release apertures have rear guides to guide said first set of rollers through said apertures.

9. The bicycle storage and retrieval assembly of claim 5, wherein said opposing angled guide walls are constructed of spring steel.

10. The bicycle storage and retrieval assembly of claim 5, wherein said upper track includes a stop means to stop said rear wheel securement assembly from moving along said upper track.

11. The bicycle storage and retrieval assembly of claim 6, wherein the release structure includes a pivot member and peg members extending outwardly from said wheel cage, said release structure further having opposing brackets each having an interior slot to receive said pivot member and an L-shaped slot to receive said peg members to thereby pivot and secure said front wheel cage.

12. A bicycle storage and retrieval assembly for securement to a storage frame structure comprising:

a) a lower track assembly secured to a storage frame structure and having opposing side channels with release apertures having guide means and further having a front portion and a nose structure disposed at and extending from said front portion, said nose structure having opposing guide and securement wall members extending upwardly, and said nose structure being disposed at a predetermined angle with respect to said lower track assembly;

b) an upper track assembly having a top and bottom, front and rear portions and having a first pair of rollers and a roll and tilt assembly with a second pair of rollers attached to said bottom, said first and second pairs of rollers arranged to move within said opposing side channels of said lower track assembly, said first pair of rollers configured to pass through said release apertures to permit said upper track to pivot about said roll and tilt assembly and with respect to said lower track assembly, said opposing guide and securement wall members of said nose assembly securing said upper track in pivotal alignment at said predetermined angle with respect to said lower track, said upper track assembly further having opposing side channels;

c) a pivotable front wheel cage structure attached to said front portion of said upper track assembly, said front wheel cage structure being pivotable about said front portion of said upper track assembly and having a release structure to release said front wheel cage structure for pivotable movement; and d) a rear wheel securement assembly including a movable base member with rollers and at least one cage structure extending therefrom to receive a rear bicycle wheel, said rear wheel securement assembly further including a locking structure for clamping and securing the rear bicycle wheel.

13. The bicycle storage and retrieval assembly of claim 12, wherein said upper track includes a stop means to stop said rear wheel securement assembly from moving along said upper track.

14. The bicycle storage and retrieval assembly of claim 12, wherein said bicycle storage and retrieval assembly includes a release mechanism for releasing said upper track to allow said upper track to move with respect to said lower track, said release mechanism being activatable from below said lower track said upper track to move with respect to said lower track that is activatable from below.

15. The bicycle storage and retrieval assembly of claim 14, wherein said release mechanism comprises a spring member and a pull member.

16. The bicycle storage and retrieval assembly of claim 12, wherein said upper track assembly further has a handle member attached thereto.

17. The bicycle storage and retrieval assembly of claim 12, wherein said release structure of said front wheel cage structure includes a pivot member and peg members extending outwardly from said wheel cage, said release structure further having opposing brackets each having an interior slot to receive said pivot member and an L-shaped slot to receive said peg members to thereby pivot and secure the front wheel cage structure.

18. The bicycle storage and retrieval assembly of claim 1, further including a release mechanism for releasing said upper track to allow said upper track to move with respect to said lower track, said release mechanism being activatable from below said lower track, wherein said release mechanism comprises a spring member and a pull member and wherein said release mechanism is positioned within said nose assembly.

* * * * *